Jan. 29, 1952  E. H. MUELLER  2,583,959
SIMMER CONTROL FOR A VALVE FOR A GASEOUS FUEL
Filed Aug. 18, 1948

INVENTOR.
Ervin H. Mueller
BY
Barnes, Kisselle, Laughlin & Raisch
ATTORNEYS.

Patented Jan. 29, 1952

2,583,959

UNITED STATES PATENT OFFICE 2,583,959

SIMMER CONTROL FOR A VALVE FOR A GASEOUS FUEL

Ervin H. Mueller, Grosse Pointe, Mich.

Application August 18, 1948, Serial No. 44,894

1 Claim. (Cl. 277—59)

This invention relates to a valve particularly for the purpose of controlling the flow of gaseous fuel to a burner and it is concerned particularly with a structure for throttling and controlling the flow of gas to a burner for effecting a low or simmer flame.

The object of the invention is to provide an improved throttling arrangement which is accessible for control through the operating stem of the valve. The parts are necessarily rather small and involve an element for sealing against leakage of the gas and which is rotatable for throttling the small flow of gas and an operating element held in position on screw threads and having a slidable and non-rotatable connection with the throttling element. In order to prevent breakage or damage to the small parts by an operator who might exert too much force thereon in attempting to manipulate the parts, the arrangement is such that heavy torque cannot be transmitted through the small elements which slidably and non-rotatably connect the throttling element and the controlling element together.

A valve constructed in accordance with the invention is shown in the accompanying drawings.

Figure 1:
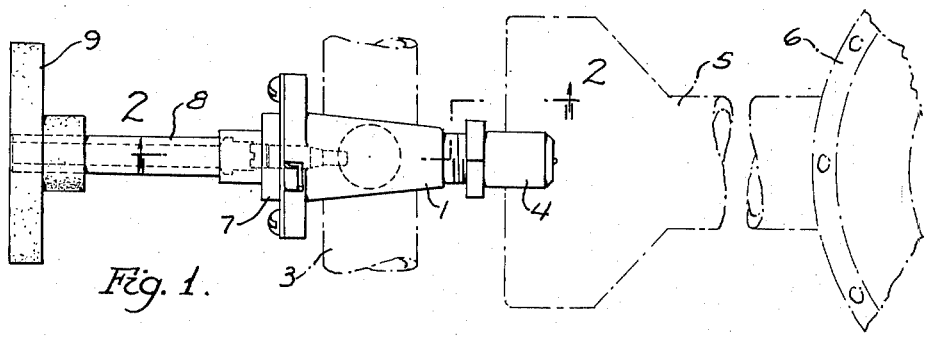
Fig. 1 is a general view illustrating the valve and showing in broken lines, a burner to which gas is to be supplied.

The valve body is generally illustrated at 1 and it has a screw threaded extension with an inlet passage 2 for connection to a gas supply pipe 3 and an outlet constituted in part by a hood 4 for supplying gas to the mixing tube 5 of a burner 6. A suitable cap 7 is attached to the body and an operating stem 8 projects through the cap and is provided with an operating handle 9.

The valve member is illustrated at 12 and it is rotatably mounted in the chamber in the valve body. The valve member has a port 13 arranged to register with the inlet passage, the port communicating with an axial passage 14 in the valve member and it has a second port 15 preferably with an enlarged end 16 for registry with the inlet passage. By reference to Fig. 4, it will be appreciated that the port 15 is in registry with the inlet passage; that by turning the valve member about 90° clockwise the port 13 may be registered with the inlet passage and that by turning the valve further clockwise, the valve is in off position. The port 13 is for a full flow of gas and the port 15 is for a lower flow of gas for a high flame and a simmer flame respectively.

The valve member has a stem portion 20 which is hollow and which is provided with internal screw threads 21. This stem portion projects through the cap. The operating stem 9 telescopes thereover and is slidably keyed thereto as at 22. The valve may embody a pair of washers 23 and 24 and a spring 25 which holds the valve member on its seat compacts the washers together and holds them against the end of the operating stem 9 which has a flange 26 for the purpose, the flange 26 abutting the cap. A friction washer 27 may be disposed between the spring and the washer 24. This washer arrangement is described and claimed in my copending application which has issued as Patent No. 2,572,507, dated October 23, 1951. Suffice it to say, that one washer turns with the valve stem and the other is loosely keyed to the body and the washers have interengaging recesses and projections for interfitting with each other under the action of the spring to indicate to the operator the position of the valve member. The structure may also embody a locking feature which prevents rotation of the valve member and which is released by axial shift of the operating stem 9 and the washers against the action of the spring 25.

Figure 4:
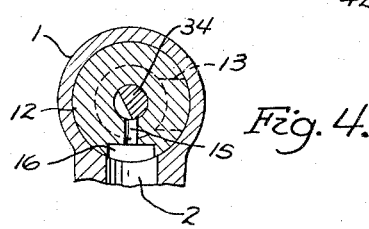
Fig. 4 is a sectional view taken substantially on line 4—4 of Fig. 2 showing the parts in simmer position.

The valve member has a bore or passage 30 which connects the hollow of the stem with the passage 14 and the port 15 opens into this passage. Substantially at the intersection of the hollow portion of the stem and the passage 30, the valve member has inclined or tapered walls 31 which constitutes a valve seat. A throttle member 33 has a tapered portion for engaging the seat 31 and a projecting valving portion 34 which extends into the passage 30 and which preferably is of D-shape in cross section, as shown in Fig. 4. This throttle member is hollow for the reception of a coil spring 40 and the throttle member is provided with opposite slots 41.

A control member 42 having a screw threaded body and a head which is slotted as at 43 for the reception of a turning tool, such as a screw driver, is arranged to be mounted on the internal threads 21 and it has a projecting T-shaped key element 45 for engaging in the slots 41.

Figure 2:
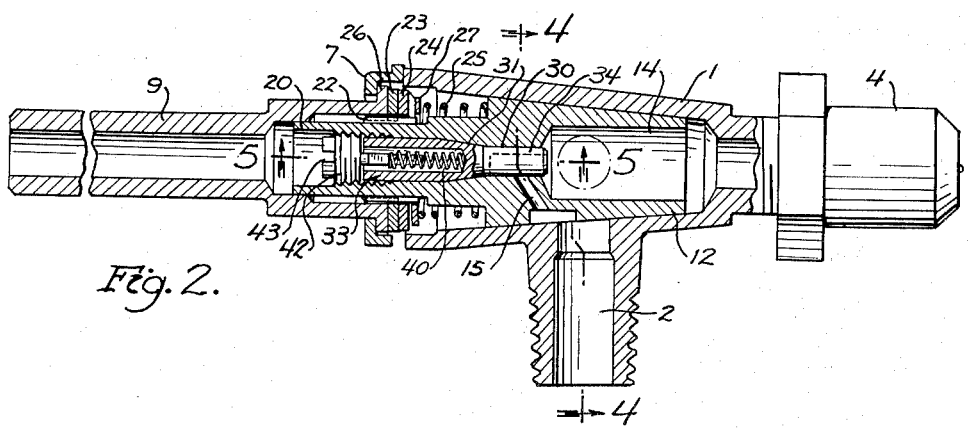
Fig. 2 is an enlarged view largely in section taken substantially on line 2—2 of Fig. 1.
Figure 3:
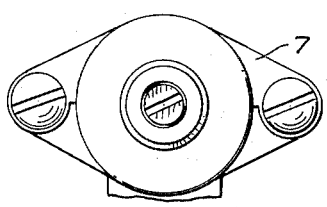
Fig. 3 is an end view of the valve.
Figure 5:
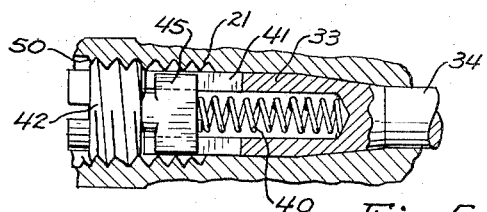
Fig. 5 is an enlarged view illustrating the simmer control features.

It will be observed by reference to Fig. 2 and Fig. 5 that the spring 40 holds the throttling member on its tapered seat and thus provides a seal against loss of gas which may enter the passage 30. The spring reacts on the control member, specifically engaging the end of the key member 45. It will be observed that by turning the control member, the throttle member is also caused to turn and the D-shape projection 34 may thus be caused to throttle the port 15 as will be appreciated by reference to Fig. 4. The control member 42 advances or retracts on its screw threads in this controlling action but this does not interfere with the fact that the throttle member 33 does not shift axially because of the slidable connection between the key member 45 and the slots 41. The compression of the spring 40 may also be regulated by turning the control member to shift it forwardly or backwardly and thus the throttle member may be urged on its seat with sufficient tightness to seal against escape of gas.

It will be appreciated that an unskilled operator might apply the turning tool to the control member and place an undue amount of torque thereon when resistance is met and this might damage the small parts and, particularly, the key and slot connection. The arrangement is such as demonstrated in Fig. 2, that if the control member is screwed home, it abuts the end of the member 33 before the end of the key member 45 abuts the bottom of the slots 41. Thus, no matter how much torque is applied to the control member when the parts are in this position, no torque can be placed on the key connection greater than that required to turn the throttle member.

Figure 6:
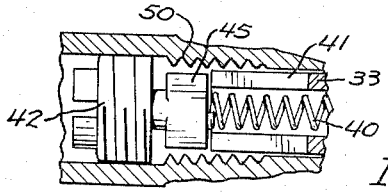
Fig. 6 is a view similar to Fig. 5 illustrating a position of the simmer control elements before they are coupled together.

A further feature is the manner of assembly as demonstrated in Fig. 6. The throttle member may be first positioned with its slots 41 in an unkown position, then the control member 42 may be disposed in the hollow stem. The threads 21 and particularly the end 50 thereof are accurately positioned so that when the control member 42 is pushed into the hollow stem the end of the key 45 will strike the end of the throttle member 33 provided, of course, the key is not aligned with the slots 41. As a result, if the control member is turned, it is not advanced on its threads. It remains in an unchanged axial position and as it is turned the key will become lined up with the slots 41 and then the control member may move axially with the key moving into the slots. It is only at this time that the screw threaded body of the control member comes into engagement with the end 50 of the internal screw threads 21. Thereafter the control member is turned and advanced on its threads thus placing the spring 40 under load and, incidentally, also turning the throttle member 33. After the control member is adequately engaged with the internal threads, the parts are assembled and it will be appreciated how a slight rotary action given to the control member rotates the throttle member and varies the flat side of the D of the projection 34 relative to the port 15 for throttling the same.

I claim:

Means for throttling the flow of fuel gas through a valve, wherein the valve has a rotary valve member with an outlet passage, a hollow operating stem, a bore between the hollow of the stem and the outlet passage, an inlet port communicating into the bore from the side thereof; a tapered seat substantially at the junction of the hollow of the stem and the bore, a throttling member positioned in the hollow stem and having a tapered portion engaging said tapered seat and having a part extending into the bore for throttling the inlet port upon rotation of the throttling member, screw threads in the hollow stem, an operating member engaged with said threads in the hollow stem and retractable for disengagement therefrom, detachable elements providing a slidable key connection between the operating member and the throttling member, whereby rotary adjustment of the operating member on its threads rotates the throttling member, a spring positioned between the operating member and the throttling member for holding the throttling member on its tapered seat, the slidable key connection between the operating member and the throttling member having a range of sliding movement in excess of the limit of the movement of the operating member toward the throttling member as the operating member is advanced on its threads, whereby the operating member will abut and may be tightened against the throttling member without transmitting the turning torque on the operating member through the slidable connection the screw threads in the stem being so positioned that the elements providing the slidable key connection are in engagement when the control member is disengaged from the screw threads in the stem.

ERVIN H. MUELLER.

REFERENCES CITED

The following references are of record in the file of this patent:

UNITED STATES PATENTS

| Number | Name | Date |
|---|---|---|
| 923,808 | Breth | June 8, 1909 |
| 2,138,767 | Matthews | Nov. 29, 1938 |
| 2,249,982 | Rutherford | July 22, 1941 |
| 2,262,703 | Stuckenholt | Nov. 11, 1941 |